United States Patent [19]

Nguyen et al.

[11] Patent Number: 5,367,471
[45] Date of Patent: Nov. 22, 1994

[54] METHOD AND APPARATUS FOR REDUCING TAPE STICTION

[75] Inventors: Thai Nguyen, Thornton; George Reichenberg, Lafayette, both of Colo.

[73] Assignee: Storage Technology Corporation, Louisville, Colo.

[21] Appl. No.: 919,151

[22] Filed: Jul. 23, 1992

[51] Int. Cl.[5] .................. G11B 15/43; B65H 59/38
[52] U.S. Cl. .................... 364/505; 364/508; 318/6; 360/74.3; 242/413
[58] Field of Search ............. 364/505, 506, 508, 565, 364/164, 165, 149; 318/6; 360/74.1, 74.3; 242/75.5, 75.51

[56] References Cited

U.S. PATENT DOCUMENTS

| | | | |
|---|---|---|---|
| 4,507,592 | 3/1985 | Anderson | 318/268 |
| 4,523,133 | 6/1985 | Messenger | 318/7 |
| 4,619,294 | 10/1986 | Sainen et al. | 139/99 |
| 4,656,534 | 4/1987 | Emmerich et al. | 360/71 |
| 4,786,992 | 11/1988 | Tajima et al. | 360/73 |
| 4,979,691 | 12/1990 | Kobayashi | 242/75.51 |
| 5,039,027 | 8/1991 | Yanagihara et al. | 252/190 |
| 5,248,112 | 9/1993 | Rodal et al. | 242/207 |

Primary Examiner—Thomas G. Black
Assistant Examiner—Michael Zanelli
Attorney, Agent, or Firm—Duft, Graziano & Forest

[57] ABSTRACT

A method and apparatus is disclosed which reduces tape stiction during tape acceleration and deceleration. Tape tension is adjusted to eliminate the effects of tape stiction when the tape is either accelerated from a stationary position to a steady state velocity, or decelerated from a steady state velocity to a stationary position. This method uses tape tension, tape velocity, and tension reference profiles stored in a microprocessor to dynamically adjust the tape tension during tape acceleration and deceleration. The tape tension is adjusted as a function of tape velocity by the use of both a current generated by the tension reference profile and a feedforward current. The feedforward current is determined by the sum of the tape velocity and tape tension profiles. This dynamic adjustment of tape tension essentially eliminates tape stiction in tape start and stop operations. The tape drive system can therefore function more error-free and more efficiently with tape drive systems which use constant tape head air pressure.

15 Claims, 5 Drawing Sheets

TENSION REFERENCE PROFILE, $T_t$

METHOD AND APPARATUS FOR REDUCING TAPE STICTION

FIELD OF THE INVENTION

This invention relates to tape drive systems and, more particularly, to a method and apparatus for reducing tape stiction during start and stop operations of a tape drive using magnetic or optical tape.

PROBLEM

In a typical magnetic or optical tape drive system, tape tension must be maintained at a constant level in the area between the tape supply spool and the take-up spool during read/write operations in order to minimize data errors incurred during read/write operations. Prior art tape drive systems have maintained a constant tape tension during the read/write operation, during acceleration and deceleration of the tape, as well as while the tape is stopped. When the tape is in motion at a steady state read/write velocity, the tape is typically separated from the tape drive read/write head by several microns of air space. However, the tape is typically in contact with the read/write head during acceleration, deceleration, and while the tape is stopped. In these situations the read/write head or an air bearing can adhere to the tape. This adhesion, which is commonly known as "stiction", can cause loss of data transferred to or from the tape drive. Data loss occurs when adhesion caused by the tape stiction exceeds the start-up torque of the tape drive motor or when the stiction is sufficient to cause physical damage to the tape at the area of stiction.

Prior art systems have typically used pressurized air to blow the tape away from the read/write head. Very high air pressure is required to keep the tape separated from the read/write head when the tape tension is maintained at a constant level during a tape start or stop operation. When constant tension is maintained on the tape during tape start and stop operations, tape stiction can still be a problem even when increased air pressure is used to blow the tape away from the read/write head.

SOLUTION

The present invention overcomes the foregoing problems and achieves an advance in the art by providing a method and apparatus which significantly reduces tape stiction by dynamically controlling tape drive motor current during tape acceleration and deceleration.

The invention comprises a method for dynamically adjusting the tension on the tape to eliminate the effects of tape stiction when the tape is either accelerated from a stationary position to a steady state velocity, or decelerated from a steady state velocity to a stationary position. When the tape is accelerated from a stationary position to a steady state velocity, the tension on the tape is increased from a predetermined nominal value to a predetermined normal value. When the tape is decelerated from the steady state velocity to a stationary position, the tension is decreased from the normal value to the nominal value.

This method uses tape velocity and tape tension information stored in a microprocessor to effect a variable motor current to dynamically adjust the tape tension during tape start and stop operations. The tape velocity information includes tape drive motor current ("velocity/current") data as a function of time during tape acceleration and deceleration. The tape tension information includes motor current ("tension/current") data and tape tension data as a function of time.

Tape velocity and tape tension information are stored in microprocessor memory in the form of "profiles". Each of these profiles constitutes information that represents either a tape drive motor current value or a tape tension value as a function of time.

The stability of the tape tension is achieved by a closed loop tension control circuit in combination with a feedforward current applied to the tape drive take-up motor. The feedforward current is determined by the sum of the tape velocity/current and tape tension/current data.

This dynamic adjustment of tape tension essentially eliminates tape stiction in tape start and stop operations. The tape drive system can therefore function more error-free and more efficiently without having to use devices which employ a variable air pressure against the tape during tape start and stop operations.

The present invention uses conventional fixed air pressure against the tape to blow the tape away from the tape drive read/write heads during tape start and stop operations. This obviates the need for using relatively higher air pressure and a correspondingly larger air compressor to reduce tape stiction. Therefore, the present invention provides improved performance with standard tape drive systems which typically do not provide a means for varying the air pressure between the tape and the read/write head during tape start and stop operations.

The invention also uses a "smoothed" acceleration waveform which is integrated to produce the tape velocity/current data. This velocity/current data is used to effect a gradual transition in tape velocity during tape acceleration and deceleration. This avoids "jerking" the tape which can result in tape damage and/or read/write errors.

DETAILED DESCRIPTION OF THE INVENTION

Figure 1:
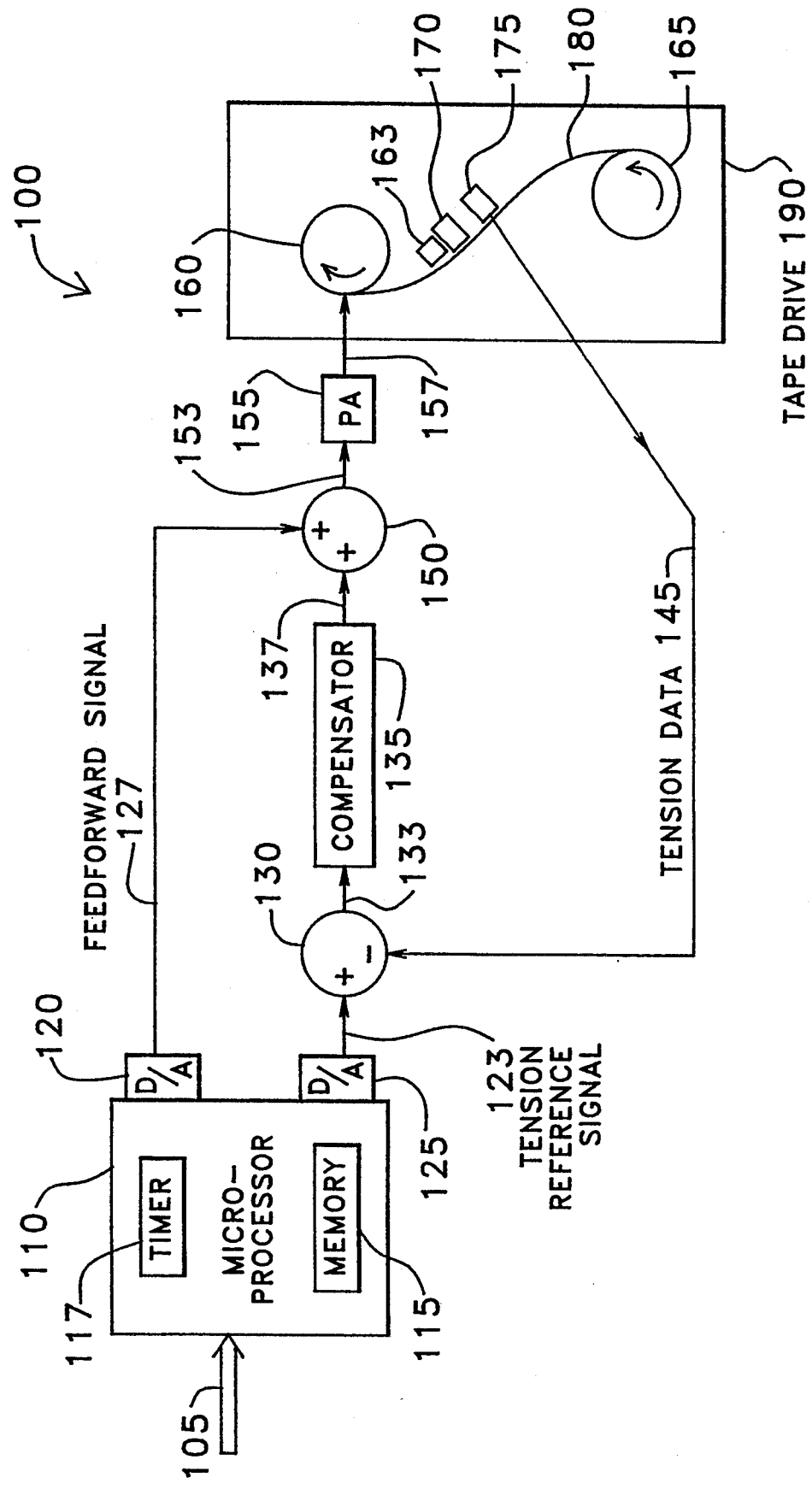
FIG. 1 illustrates of the apparatus of the present invention.

FIG. 1 is a block diagram of the apparatus 100 of the present invention. The magnitude of "stiction" between a tape 180 and a tape drive read/write head 170 is influenced by the physical and chemical properties of the interface between tape 180 and read/write head 170. Other factors which influence tape stiction include the humidity of the environment, the texture of the relative surfaces of tape 180 and read/write head 170, and the duration of contact between tape 180 and read/write head 170. The present invention essentially eliminates the effects of tape stiction which are due to the above factors and other random factors.

Apparatus 100 uses information stored in a microprocessor 110 to dynamically adjust the tape tension to reduce tape stiction between tape 180 and read/write head 170. The present invention also reduces tape stiction between tape 180 and tension sensor 175. Two outputs 123, 127 from microprocessor 110 control the tension on tape 180 as a function of the velocity of tape 180 during tape start and stop operations.

Tape drive 190 controls the tension on tape 180 via a closed loop comprising elements 130, 133, 135, 137, 150, 153, 155, 157, and 145. This closed loop functions to maintain a tape tension equal to the value of a tension reference signal 123.

Prior art systems maintain a tension reference signal at a constant value, regardless of tape velocity. In contrast to the prior art, the present invention increases the tension on tape 180 from a predetermined nominal value to a predetermined normal value when tape 180 is accelerated from a stationary position to a steady state read/write velocity. When tape 180 is decelerated from the steady state read/write velocity to a stationary position, the tape tension is reduced from the normal value to the nominal value.

In the present invention, an additional input to closed loop 130, 133, 135, 137, 150, 153, 155, 157, 145 is introduced by feedforward signal 127. Feedforward signal 127 is used to improve the response time and bandwidth of this closed loop. Feedforward signal 127 is determined by microprocessor 110 by summing certain tape velocity and tape tension information stored in microprocessor memory 115.

Tape velocity and tape tension information are stored in microprocessor memory 115 in the form of "profiles". Each of these profiles constitutes information that represents either a tape drive motor current value or a tape tension value as a function of time. These profiles include tape velocity/current profile $I_v$, tape tension/current profile $I_T$, and tension reference profile $T_t$. Tape velocity/current profile $I_v$ and tape tension/current profile $I_T$ comprise information that represents a desired value of tape drive motor 160 current as a function of time. Tension reference profile $T_t$ represents a desired value of tape tension as a function of time. Each of the above profiles represents a tape drive motor current or tape tension value as a function of a series of time "samples" n, n+1, ... N (where N is equal to a maximum number of samples). Each sample n represents the desired value of tape drive motor current or tape tension at a fixed time relative to the previous sample (n−1) or subsequent sample (n+1). A sample period begins when tape 180 begins a start or a stop operation. The duration of sample interval $t_s$ between each sample n and subsequent sample n+1 is thus equal to TA/N, where TA is the total time between the first sample (where n=1) and final sample N.

Theory of Operation

Apparatus 100 comprises microprocessor 110 connected by control circuitry to tape drive 190. This control circuitry includes a closed loop circuit for controlling tape tension and a feedforward circuit for improving the response time of the closed loop circuit.

In operation, tape motion information 105 is typically input to microprocessor 110 from a host computer (not shown). This information indicates whether tape 180 is being accelerated or decelerated, i.e., whether tape 180 is being started or stopped.

Microprocessor 110 has two outputs to control the acceleration/deceleration of tape 180 in tape drive 190. A first digital output is applied to D/A converter 120 to provide analog feedforward signal 127 to adder 150. It should be noted that apparatus 100 could operate effectively without adder 150 or feedforward signal 127. A second digital output is applied to D/A converter 125 to provide tension reference signal 123 to comparator 130. Comparator 130 is connected to compensator 135 which provides output 137 to adder 150. Comparator 130 receives a tension signal 145 from tension sensor 175. Tension signal 145 indicates the amount of tension applied to tape 180. Comparator 130 provides an error signal output 133 to compensator 135 based on a comparison of tension reference signal 123 and tension signal 145. Compensator 135 produces an output current 137 which is a function of error signal output 133 from comparator 130. Compensator 135 further functions in well-known fashion to regulate the response of closed loop 130, 133, 135, 137, 150, 153, 155, 157, 145 to avoid oscillation. Output current 137 from compensator 135 is summed with feedforward current 127 by adder 150 to produce a motor control current 153 which is input to power amplifier 155. The output 157 of power amplifier 155 is input to take-up motor 160 to control the tension on tape 180. Tape tension is controlled in a well-known manner by closed loop 130, 133, 135, 137, 150, 153, 155, 157, 145. Such a closed loop is used, for example, in the model 4280 tape drive system manufactured by Storage Technology Corp., Louisville, Colo. 80028.

Tape 180 runs from supply motor 165 past tension sensor 175 and across read/write head 170. Air supply 163 provides a constant air pressure to force tape 180 away from read/write head 170 during tape start/stop operations. Tension sensor 175 measures tape tension via a transducer operative with an air bearing (not shown). Tension sensor 175 provides tape tension data 145 to comparator 130. Tape supply motor 165 is controlled by well-known methods.

Tension Reference Profile

Figure 2:
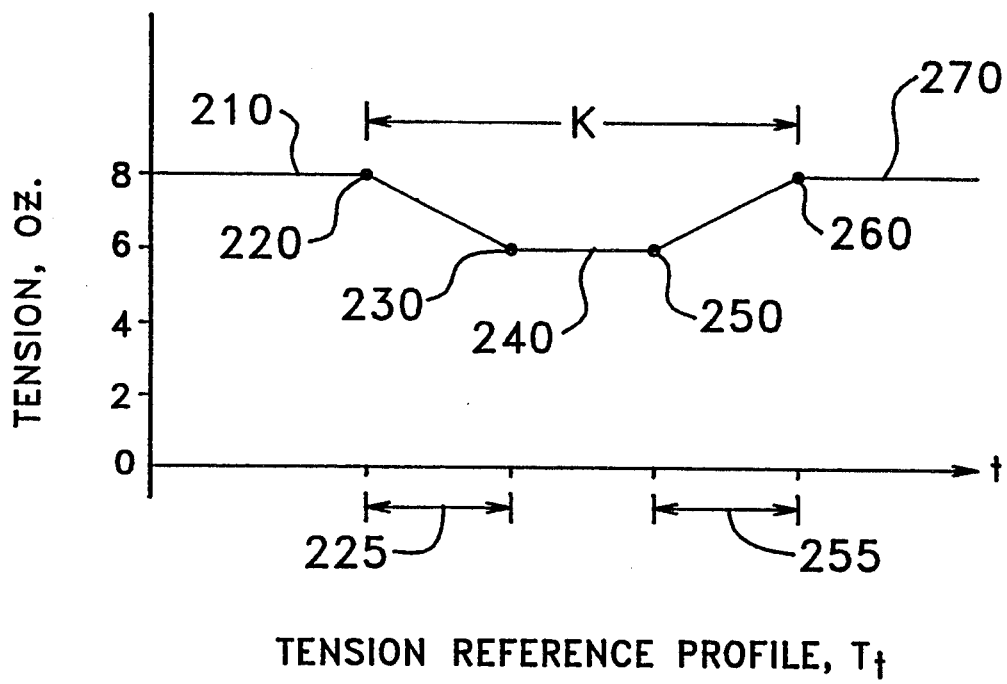
FIG. 2 is a graph of tape tension as a function of time.
Figure 3:
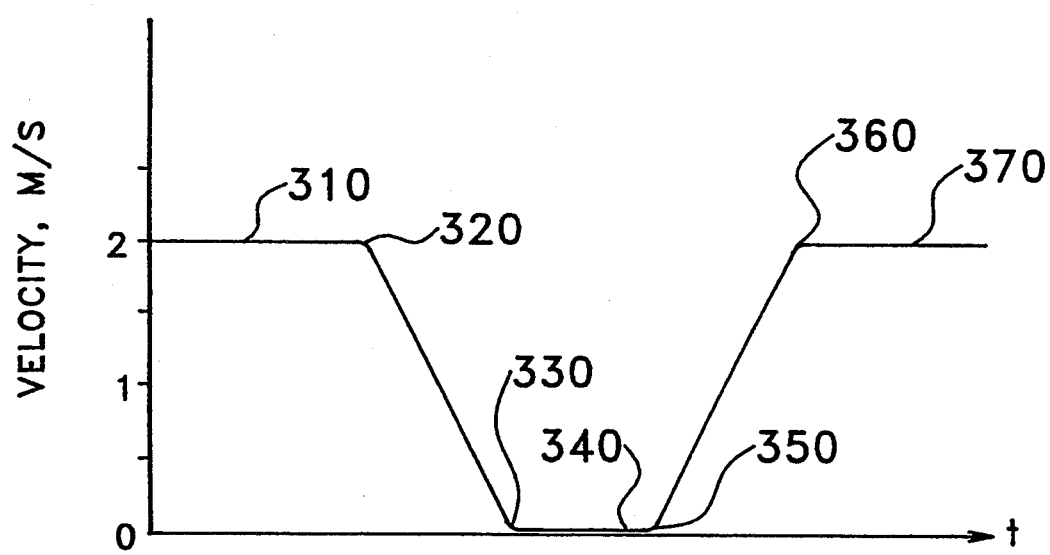
FIG. 3 is a graph of tape velocity as a function of time.

FIG. 2 illustrates one example of a tension reference profile $T_t$ showing tape tension in ounces as a function of time in an exemplary embodiment of this invention. The tension reference profile $T_t$ shown in FIG. 2 is calculated to eliminate tape stiction. FIG. 3 is a graph of tape velocity in meters per second as a function of time. The tape velocity in FIG. 3 is timewise directly related to the tape tension in FIG. 2. In the following section, reference numbers are directed to both FIGS. 2 and 3 because of the interrelationship of the two Figures.

Tension reference profile $T_t$ is stored in microprocessor memory 115 in fixed time sample intervals $t_s$. In the stored tension reference profile $T_t$, a desired tape tension value is stored for each of the time sample intervals $t_s$.

As shown in FIG. 2, at 210, and in FIG. 3, at 310, tape 180 is traveling at a nominal steady state velocity of two meters per second (m/s) and has a nominal tension of eight (8) ounces applied thereto. At 220/320, tape deceleration is initiated and at 230/330, tape 180 is stopped. In the interval 225 between 220/320 and 230/330, the tape tension is reduced from eight ounces to six ounces in a nominal time period of 64 milliseconds. In area 240/340, tape 180 is stopped. The length of time during which tape 180 is stopped is not critical. At 250/350, tape 180 is accelerated and at 260/360, tape 180 reaches a nominal steady state velocity of 2 m/s. In the interval 255 between 250 and 260, the tape tension is increased from six ounces to eight ounces in a nominal time period of 64 milliseconds. Tape tension is maintained at a nominal value of eight ounces at 270/370 while a read/write operation is performed.

Between a start and stop operation, as shown between reference numbers 220/320 and 260/360, the tape drive read/write head air pressure is maintained at a constant value K by a stream of air having a substantially constant pressure generated by air supply 163.

The following variables are used to calculate the tension reference profile $T_f$:

TA = Tape Start/Stop time duration
$t_s$ = Sample interval
N = Total number of samples $$N = \frac{TA}{t_s}$$

$T_{max}$ = Max. tape tension
$T_{min}$ = Min. tape tension
Inc/Dec = Tape tension Increment/Decrement per sample interval Therefore:

$$\text{Inc/Dec} = \frac{T_{max} - T_{min}}{N}$$

and

Tension(n) = Tension(n−1) ± Inc/Dec where n = n$^{th}$ sample number and Inc/Dec corresponds to a tape acceleration or deceleration operation, respectively. Tape start/stop time TA is the time interval during a start or stop operation; i.e., the time required to accelerate tape 180 from zero velocity to steady state read/write velocity, or the time required to decelerate tape 180 from steady state read/write velocity to zero velocity.

In an exemplary embodiment of the present invention, the sample interval $t_s$ is 1 millisecond. The total number of samples N is a function of the length of the time interval during a start/stop operation. A typical total number of samples N used in a start or stop operation in one embodiment on the present invention is 64.

Generation of Velocity/Current Profile

Velocity/Current Profile $I_v$ is generated offline from microprocessor 110 and tape drive 190 by a separate computer system using the following equations and parameters:

The tape drive motor torque can be expressed by the following equation:

$$T = K_T I = J\theta \quad (1)$$

where:
$K_T$ = motor torque constant
I = current in motor winding
J = Total inertia
$\theta$ = angular acceleration Total inertia J is the sum of the inertia of the tape spool together with the inertia of tape 180 on the tape spool and the inertia of motor 160. Solving equation (1) for I produces:

$$I = \frac{J}{K_T} \theta \quad (2)$$

Angular acceleration is also given by:

$$\theta = \frac{a}{r} \quad (3)$$

where:
a = linear acceleration; and
r = radius of tape 180 on spool

Substituting (3) into (2) provides:

$$I = \frac{J}{K_t} \cdot \frac{1}{r} \cdot a \quad (4)$$

Figure 5:
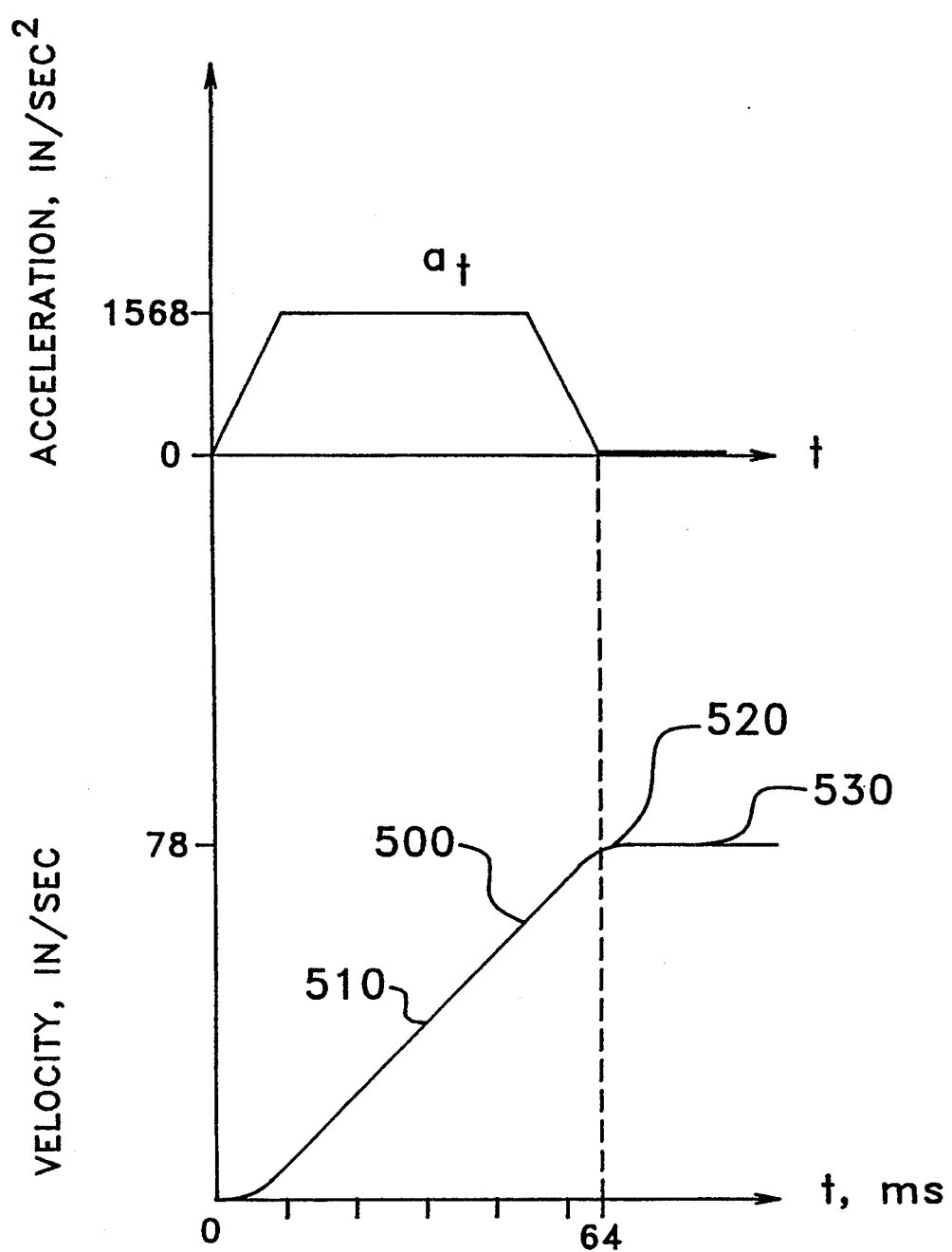
FIG. 5 is a graph illustrating a tape velocity profile.

In order to generate tape velocity/current profile $I_V$, an acceleration profile $a_t$ must be calculated to provide the desired velocity profile $V_t$. Acceleration profile $a_t$ is also generated off-line by a separate computer system. One example of an acceleration profile $a_t$ is shown in FIG. 5 as described below. Acceleration profile $a_t$ represents the desired tape acceleration or deceleration as a function of time when tape 180 is accelerated or decelerated. When a suitable acceleration profile $a_t$ is determined by a software simulation method shown below, the velocity/current profile $I_V$ can be calculated by substituting $a_t$ into the value of a in equation (4):

$$I_V = \frac{J}{K_t} \cdot \frac{1}{r} \cdot a_t \quad (5)$$

Equation (5) thus represents the tape velocity/current profile as a function of time when a start or stop operation is performed.

Software Simulation of Velocity/Current Profile $I_V$

Figure 4:
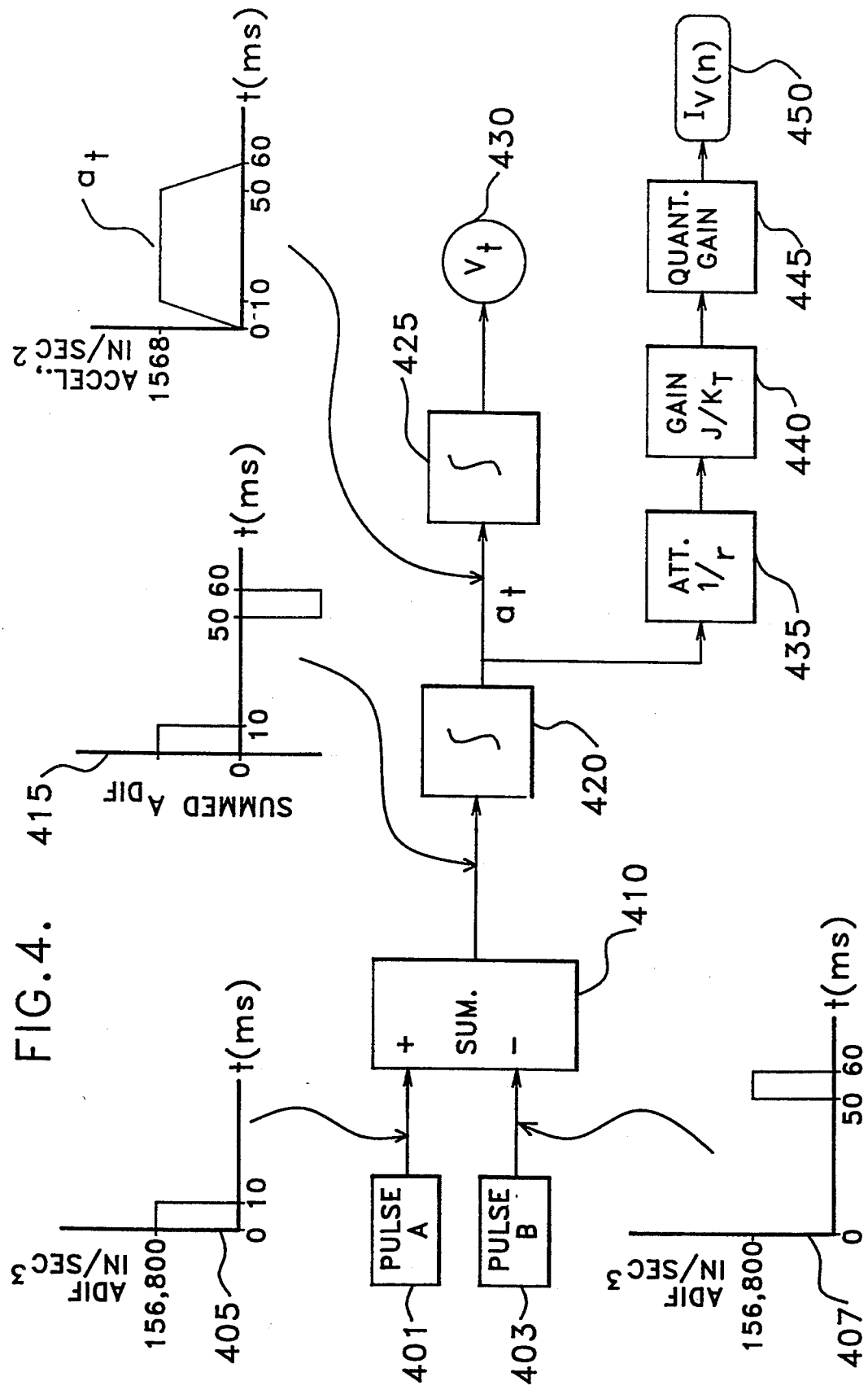
FIG. 4 illustrates the steps required to generate a quantized current as a function of a desired acceleration profile.

FIG. 4 shows the block diagram of the software simulation process used to generate velocity/current profile $I_V$ for a tape start operation. This simulation process is executed in a computer system offline from microprocessor and tape drive 190. Once a velocity/current profile $I_V$ has been generated, it is then stored in microprocessor 110.

Blocks 401, 403, 410, and 420 are used to generate acceleration profile $a_t$. Simulated pulse A is generated in block 401 and simulated pulse B is generated in block 403. These pulses are represented by graphs 405 and 407, respectively. Pulse A and pulse B are input to summer 410 wherein pulse B is inverted and summed with pulse A to produce the waveform shown in graph 415. The vertical axes in graphs 405 and 407 represent differentiated acceleration in inches/second$^3$. The vertical axis in graph 415 represents the summed output of graphs 405 and 407 in inches/second$^3$.

Waveform 415 is input to block 420 which integrates waveform 415 to produce acceleration profile $a_t$. Acceleration profile $a_t$ is then input to block 425 where it is further integrated to provide velocity information $V_t$ at 430. Acceleration profile $a_t$ is also input to block 435.

At block 435, acceleration profile $a_t$ is attenuated by a factor of 1/r. This attenuated value is then adjusted by a gain factor of $J/K_t$ at block 440. Attenuation factor 1/r and gain factor $J/K_t$ correspond to the same factors in equation (5) above. The output from block 440 is the (un-normalized) value of the tape drive motor current needed to accelerate tape 180 to the nominal read/write speed at a given time. The output of block 440 is then quantized (normalized and digitized) in block 445 using quantization factor QA to produce a digital value $I_v(n)$ for a given time sample (n). Block 450 represents the quantized velocity/current $I_v(n)$ for a given sample n. Each sample n is stored in velocity/current profile $I_v$ in a look-up table in microprocessor memory 115 as a function of sample number n for sample numbers 1 through N.

Quantization factor QA is used in block 445 to adjust the value of the output $I_v(n)$ from block 440 to produce a value that will provide the proper current to take-up motor 160 when apparatus 100 is in operation. The adjusted value is then stored in microprocessor 110 for each sample n. Quantization factor QA is equal to 25.5 in an exemplary embodiment of the present invention wherein $J/K_t$ has a value of 0.001851, r is equal to 0.984 inches, and the desired steady state tape velocity is equal to 78.74 inches per second. Quantization factor QA is determined by dividing the total number of bits of resolution used in microprocessor 110 (to store amperage values) by the maximum amperage produced by power amplifier 155. Quantized current $I_v$ values are used to assist in the control of tape tension during a tape start/stop operation. The data for a tape stop operation is generated in a similar fashion.

Velocity information $V_t$ output at 430 is used to determine the values of pulse A and pulse B in the simulation process so that the quantized current values $I_v(n)$ produce the desired tape velocity.

The acceleration profile $a_t$ in this example is shown in greater detail in FIG. 5. This profile $a_t$, when integrated, provides a set of values corresponding to the current required to accelerate tape drive take-up motor 160 to provide the desired tape tension as a function of tape velocity and time.

Acceleration profile $a_t$ is used to generate a curve having "smoothed" corners at 510 and 520 of the substantially linear tape velocity curve 500 shown in FIG. 5 upon tape acceleration from zero velocity to steady state velocity shown at 530. Corners 510 and 520 of tape velocity curve 500 are smoothed to avoid "jerking" the tape upon acceleration. Tape "jerking" can result in tape damage and/or read/write errors. A deceleration profile can be generated in a similar manner.

A computer simulation program is used to generate the values for quantized current as a function of time. These generated quantized current samples are stored in a look-up table in microprocessor memory 115. The look-up table is accessed by using the sample number n as an index into the table.

Generation of Tension/Current Profile

Tension/Current Profile $I_{Tension}$ is generated offline from microprocessor 110 and tape drive 190 by a separate computer system using the following equations and parameters:

The tape tension F is related to the tape drive motor torque by:

$$T = rF = K_T I \qquad (1)$$

where
T = motor torque
r = radius of tape 180 on spool
F = tape tension (Force)
$K_T$ = motor torque constant
I = current in motor winding
From (1)

$$I = \frac{rF}{K_T} \qquad (2)$$

If n is the sample number, then (2) can be written as:

$$I(n) = \frac{rF(n)}{K_T} \qquad (3)$$

I(n) is then quantized to obtain tension profile $I_{Tension}$, which is the set of digital values needed to create tension F(n) for a given $n^{th}$ sample. Tension/current profile $I_{Tension}$ is stored in microprocessor memory 115.

Tape Tension Control During Start/Stop Operations

Figure 6:
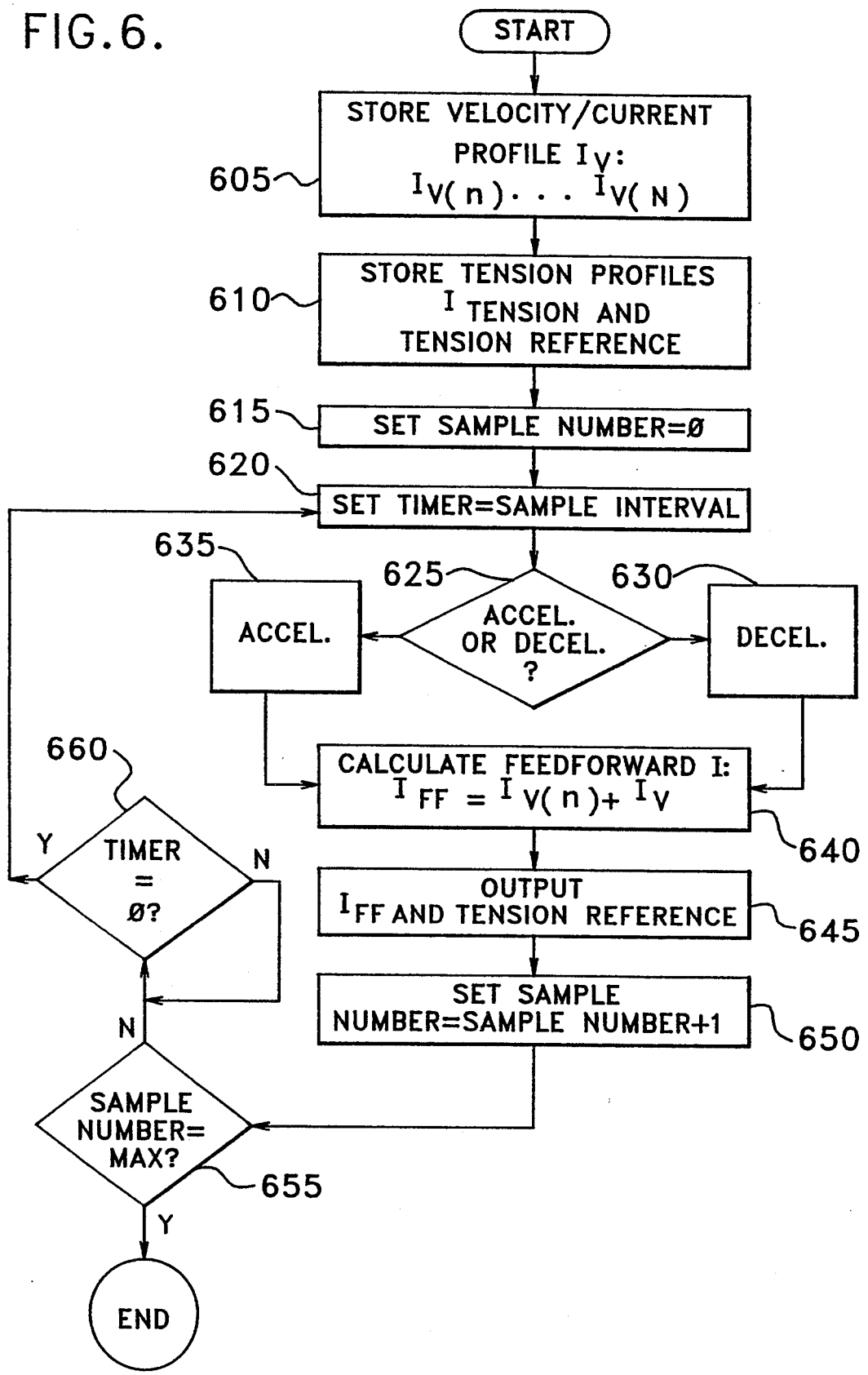
FIG. 6 is a flow chart of the process used to control tape tension during tape start and stop operations.

FIG. 6 is a flow chart of the process used by microprocessor 110 to control tape tension during tape start and stop operations. At step 605, velocity/current profile $I_v$ is stored in microprocessor memory 115. At step 610, tension profile $I_T$ and tension reference profile $T_t$ are stored in microprocessor memory 115. Steps 605 and 610 are performed only once prior to tape drive 190 operation.

Steps 615 through 660 are performed as necessary during tape drive start and stop operations. At step 615, sample number n is set to zero. Timer 117 is set to a desired sample interval at step 620. At step 625, start/stop data from a host computer (not shown) is checked to determine whether an acceleration or a deceleration operation is to be performed. If an acceleration operation is to be performed, then at step 635, acceleration data is then selected in microprocessor memory 115. If a deceleration operation is to be performed, then at step 630 deceleration data is selected in microprocessor memory 115.

At step 640 a digital value for feedforward current $I_{FF}$ is calculated by microprocessor 110 by adding the $I_{Tension}(n)$ value in tension/current profile $I_{Tension}$ and the quantized value for motor current in velocity/current profile $I_v$ which correspond to the present sample number n. At step 645, values for feedforward current $I_{FF}$ and tension reference $T_t$ are output to D/A converters 120 and 125, respectively. These values $I_T$, $I_v$, $I_{FF}$, and $T_t$ are used to control tape drive take-up motor 160 in order to effect proper tape tension. Sample number n is incremented at step 650. If, at step 655, sample number n equals a predetermined maximum sample number N, then this routine is exited.

If, at step 655, sample number n is less than maximum value N, then at step 660, timer 117 is checked to determine whether the present sample interval has timed out. If not, step 660 is repeated until timer 117 times out. After time-out has occurred, control is transferred to step 620.

Table I, listed in the Appendix to this document, shows the relationship between quantized velocity/current $I_v$ data as a function of (1) time, (2) target tape velocity, and (3) tape drive take-up motor current for a tape acceleration operation. In Table I, quantized velocity/current $I_v$ is a digital value, time is represented in seconds, target (desired) tape velocity is shown in inches per second, and tape drive take-up motor current is shown in Amps. The values for quantized velocity/current $I_v$ are stored in a look-up table in microprocessor memory 115.

Table I represents a tape start operation encompassing a tape acceleration time of 64 milliseconds, wherein data is sampled each millisecond. 64 sample intervals (n) are thus represented, and the value of n for a given sample corresponds to the value of Time in milliseconds.

For an exemplary sample n, where n=3, the following can be observed from Table I:

(a) Time from initiation of start operation=0.003 seconds (3 milliseconds);

(b) the corresponding quantized velocity/current $I_v$ stored in microprocessor memory 115 has a value of 23;

(c) the velocity of tape 180 should be 0.7 inches per second; and (d) 0.88 amps should be output to take-up motor 160 to achieve the target velocity of 0.7 inches per second in (c) above.

In operation, for sample number 3, the quantized velocity/current $I_v(n)$ digital value of 23 is summed with the corresponding value $I_{Tension}(n)$ for sample number 3 in the tension/current profile look-up table (not shown) to produce a summed value $(I_v(n)+I_{Tension}(n))$. This summed value is then output to D/A converter 120 to produce feedforward current $I_{FF}$. Operation of apparatus 100 then takes place as described above.

The data in table I was generated by TUTSIM simulation software Version 5.2 manufactured by Applied i, Inc., 200 California Ave., Palo Alto, Calif. 94306.

It is to be expressly understood that the claimed invention is not to be limited to the description of the preferred embodiment but encompasses other modifications and alterations within the scope and spirit of the inventive concept.

TABLE 1

METHOD FOR REDUCING TAPE STICTION
Appendix A

| Time (Seconds) | Quantized Current $I_v$ | Tape Velocity (in/sec) | Motor Current (Amps) |
|---|---|---|---|
| 0.000 | 0 | 0.0 | 0.00 |
| 0.001 | 8 | 0.0 | 0.29 |
| 0.002 | 15 | 0.3 | 0.58 |
| 0.003 | 23 | 0.7 | 0.88 |
| 0.004 | 30 | 1.2 | 1.17 |
| 0.005 | 38 | 1.9 | 1.47 |
| 0.006 | 45 | 2.8 | 1.76 |
| 0.007 | 53 | 3.8 | 2.06 |
| 0.008 | 60 | 5.0 | 2.35 |
| 0.009 | 68 | 6.3 | 2.65 |
| 0.010 | 75 | 7.8 | 2.94 |
| 0.011 | 76 | 9.4 | 2.96 |
| 0.012 | " | 10.9 | " |
| 0.013 | " | 12.5 | " |
| 0.014 | " | 14.1 | " |
| 0.015 | " | 15.7 | " |
| 0.016 | " | 17.2 | " |
| 0.017 | " | 18.8 | " |
| 0.018 | " | 20.4 | " |
| 0.019 | " | 22.0 | " |
| 0.020 | " | 23.5 | " |
| 0.021 | " | 25.1 | " |
| 0.022 | " | 26.7 | " |
| 0.023 | " | 28.3 | " |
| 0.024 | " | 29.9 | " |
| 0.025 | " | 31.4 | " |
| 0.026 | " | 33.0 | " |
| 0.027 | " | 34.6 | " |
| 0.028 | " | 36.2 | " |
| 0.029 | " | 37.7 | " |
| 0.030 | " | 39.3 | " |
| 0.031 | " | 40.0 | " |
| 0.032 | " | 42.5 | " |
| 0.033 | " | 44.0 | " |
| 0.034 | " | 45.6 | " |
| 0.035 | " | 47.2 | " |
| 0.036 | " | 48.8 | " |
| 0.037 | " | 50.3 | " |
| 0.038 | " | 51.9 | " |
| 0.039 | " | 53.5 | " |
| 0.040 | " | 55.1 | " |
| 0.041 | " | 56.6 | " |
| 0.042 | " | 58.2 | " |
| 0.043 | " | 59.8 | " |
| 0.044 | " | 61.4 | " |
| 0.045 | " | 62.9 | " |
| 0.046 | " | 64.5 | " |
| 0.047 | " | 66.1 | " |
| 0.048 | " | 67.7 | " |
| 0.049 | " | 69.2 | " |
| 0.050 | " | 70.8 | " |
| 0.051 | 68 | 72.3 | 2.65 |
| 0.052 | 60 | 73.6 | 2.35 |
| 0.053 | 53 | 74.8 | 2.06 |
| 0.054 | 45 | 75.8 | 1.76 |
| 0.055 | 38 | 76.7 | 1.47 |
| 0.056 | 30 | 77.4 | 1.17 |
| 0.057 | 23 | 78.0 | 0.88 |
| 0.058 | 15 | 78.4 | 0.58 |
| 0.059 | 8 | 78.6 | 0.29 |
| 0.060 | 0 | 78.7 | 0 |
| 0.061 | 0 | 78.7 | 0 |
| 0.062 | 0 | 78.7 | 0 |
| 0.063 | 0 | 78.7 | 0 |
| 0.064 | 0 | 78.7 | 0 |

We claim:

1. A method for reducing adhesion between a tape drive read/write head and the surface of a tape passing across said tape drive read/write head during tape start and stop operations, said method comprising the steps of:

(a) reducing the tension on said tape to a first predetermined amount while said tape is decelerated from a predetermined velocity to zero velocity;

(b) increasing said tension on said tape to a second predetermined amount while said tape is accelerated from zero velocity to said predetermined velocity and;

wherein the tension of said tape is controlled by a microprocessor and the tension on said tape is dynamically determined by the steps of:

(1) storing a tape velocity/current profile in a memory wherein said tape velocity/current profile includes a range of tape drive motor current computed as a function of time with respect to an acceleration and a deceleration of said tape:

(2) storing a tension reference profile in said memory connected to said microprocessor wherein said tension reference profile includes a range of said tape tension computed as a function of time with respect to said acceleration and said deceleration of said tape; and (3) using said tape velocity/current profile and said tension reference profile to control said tension of said tape via said microprocessor during said acceleration and said deceleration of said tape.

2. The method of claim 1, wherein:

(a) said microprocessor is operably connected to a tape drive tape-up motor in said tape drive; and (b) said microprocessor provides a feedforward current to said tape drive take-up motor to more rapidly effect a said tension on said tape.

3. The method of claim 2, wherein said feedforward current is computed as a sum of:
(a) a first current determined by said velocity/current profile; and
(b) a second current determined by a tension/current profile which compensates for said tension to provide a desired value of said tension on said tape as a function of time during said tape start and stop operations.

4. The method of claim 1, wherein a stream of air having a substantially constant pressure is applied to said surface of said tape to reduce adhesion between said read/write head and said surface of said tape while said tape is decelerated and accelerated.

5. The method of claim 1, wherein said tape is accelerated and decelerated in a substantially linear fashion.

6. A method for reducing adhesion between a tape drive read/write head and the surface of a tape passing across said read/write head during tape start and stop operations, said method comprising the steps of:
(a) determining a reference tape tension value based on the velocity of said tape as a function of time;
(b) reducing the tape tension in accordance with said reference tension value from a first predetermined amount of tape tension to a second predetermined amount of tape tension while said tape is decelerated from a predetermined velocity to zero velocity; and
(c) increasing the tension on said tape in accordance with said reference tension value to said first predetermined amount of tape tension while said tape is accelerated from zero velocity to said predetermined velocity.

7. The method of claim 6, wherein a stream of air having a substantially constant pressure is applied to said surface of said tape to reduce adhesion between said read/write head and said surface of said tape while said tape is decelerated and accelerated.

8. A method for reducing adhesion during tape start and stop operations between a tape drive read/write head and the surface of a tape passing across said read/write head, wherein said tape is wound on a tape spool rotated by a motor, said method comprising the steps of:
(a) quantizing a plurality of motor current values to produce a velocity/current profile wherein a value of current to be applied to said motor is generated for each of a predetermined number of sample intervals;
(b) storing a tension reference profile comprising a digital tension value representing a desired tape tension as a function of each of said predetermined number of sample intervals;
(c) inputting a control current to said motor representative of said digital tension value to control said motor during said tape start and stop operations;
(d) wherein said control current is such that the tension on said tape is reduced in accordance with said tension reference profile from a first predetermined amount of tension to a second predetermined amount of tension while said tape is decelerated to zero velocity; and
(e) wherein the tension on said tape is increased in accordance with said tension reference profile to said first predetermined amount of said tension while said tape is accelerated from zero velocity to a predetermined velocity.

9. The method of claim 8, including the additional steps of:
(a) generating an acceleration profile waveform which represents said plurality of motor current values based on the torque of said motor, the inertia of said tape spool together with the inertia of said tape on said tape spool and the inertia of said motor, and the angular acceleration of said tape relative to said tape spool; and
(b) using said acceleration profile waveform to produce said velocity/current profile.

10. Apparatus for reducing adhesion between a read/write head in a tape drive and the surface of a tape passing across said read/write head during a tape start operation and a tape stop operation, said apparatus comprising:
(a) a microprocessor;
(b) tension reference means in said microprocessor for generating a tension reference signal as a function of time;
(c) sensor means for determining a value of the tension on said tape;
(d) comparator means connected to said sensor means and said tension reference means for generating an error signal indicative of the difference between said tension reference signal and said value of said tension on said tape;
(e) compensator means having an input connected to said comparator means and responsive to said error signal for generating a control current for controlling a take-up motor in said tape drive to control the tension on said tape in accordance with said tension reference signal;
(f) amplifier means connected between the output of said compensator means and said take-up motor to apply said current to drive said take-up motor; and
(g) wherein said tension on said tape is increased during a said start operation and decreased during a said stop operation according to said control current.

11. The apparatus of claim 10, wherein said tension reference signal is determined as a function of time with respect to an acceleration and a deceleration of said tape.

12. The apparatus of claim 10, further including:
(a) an adder connected between the output of said compensator means and said amplifier means; and
(b) feedforward means in said microprocessor connected to said adder for generating a feedforward current to drive said take-up motor to control said tension on said tape as a function of time during said tape start and stop operations.

13. The apparatus of claim 12, wherein said feedforward current is calculated according to:
(a) a tape velocity/current profile wherein a first component of said feedforward current is represented as a function of said velocity of said tape; and
(b) a tape tension/current profile wherein a second component of said feedforward current is represented as a function of said tension on said tape.

14. The apparatus of claim 13, wherein said tape velocity/current profile and said tape tension/current profile are both stored in a memory in said microprocessor.

15. The apparatus of claim 10, further comprising:
means for applying a stream of air having a substantially constant pressure to said surface of said tape to reduce adhesion between said read/write head and said surface of said tape while said tape is decelerated and accelerated.

* * * * *